(12) United States Patent
Persson

(10) Patent No.: US 12,128,335 B2
(45) Date of Patent: Oct. 29, 2024

(54) FILTER PANEL FOR DRUM FILTERS

(71) Applicant: N P innovation AB, Malmö (SE)

(72) Inventor: Nils-Åke Persson, Malmö (SE)

(73) Assignee: N P innovation AB, Malmo (SE)

( * ) Notice: Subject to any disclaimer, the term of this patent is extended or adjusted under 35 U.S.C. 154(b) by 414 days.

(21) Appl. No.: 17/619,703

(22) PCT Filed: Jun. 8, 2020

(86) PCT No.: PCT/SE2020/000013
§ 371 (c)(1),
(2) Date: Dec. 16, 2021

(87) PCT Pub. No.: WO2020/256611
PCT Pub. Date: Dec. 24, 2020

(65) Prior Publication Data
US 2022/0305413 A1 Sep. 29, 2022

(30) Foreign Application Priority Data
Jun. 20, 2019 (SE) .................... 1930213-2

(51) Int. Cl.
*B01D 33/067* (2006.01)
*B01D 29/03* (2006.01)
*B01D 33/073* (2006.01)

(52) U.S. Cl.
CPC .......... *B01D 33/067* (2013.01); *B01D 29/03* (2013.01); *B01D 33/073* (2013.01); *B01D 2201/605* (2013.01)

(58) Field of Classification Search
CPC .... B01D 33/067; B01D 29/03; B01D 33/073; B01D 2201/605; B01D 25/215; B01D 29/05; B01D 33/06

USPC ..... 210/402, 499, 210, 217, 380.1, 394, 326
See application file for complete search history.

(56) References Cited

U.S. PATENT DOCUMENTS

| 3,837,499 A | 9/1974 | Luthi |
| 5,076,924 A * | 12/1991 | Persson ................. B01D 29/39 55/494 |
| 2017/0043284 A1 | 2/2017 | Petit et al. |

FOREIGN PATENT DOCUMENTS

| CN | 203281426 U | 11/2013 |
| CN | 108055829 A | 5/2018 |
| CN | 207667261 U * | 7/2018 |
| DE | 202010008227 U1 | 10/2010 |
| KR | 20010047208 A | 6/2001 |

(Continued)

OTHER PUBLICATIONS

European Extended Search Report for Application No. 20826733.6 dated May 16, 2023.

(Continued)

*Primary Examiner* — Madeline Gonzalez
(74) *Attorney, Agent, or Firm* — MOSER TABOADA

(57) ABSTRACT

The present invention relates to a filter panel (1) intended for a drum filter (2), said filter panel (1) having multiple filter holes (3) wherein each filter hole (3) has a length L and a width W, wherein at least a substantial amount of the filter holes (3) has a length L which is at least 1.5 times the width W, wherein the filter panel (1) has a free surface area which is higher than 81%, preferably at least 83%, more preferably at least 85%, on a side of the filter panel (1) intended to be in contact with a filter cloth of the drum filter (2).

19 Claims, 3 Drawing Sheets

(56) References Cited

FOREIGN PATENT DOCUMENTS

| | | |
|---|---|---|
| KR | 101009439 B1 | 1/2011 |
| WO | WO-97/12080 | 4/1997 |
| WO | WO-2009/011864 A1 | 1/2009 |
| WO | WO-2016207143 A1 | 12/2016 |

OTHER PUBLICATIONS

"The drum filter of Filtreco is there" Aquatechnobel. YouTube 1-9 [online] [video]. Apr. 18, 2014, [retrieved on Dec. 16, 2019) retrieved from: < https://www.youtube.com/watch?v=tFHQDR80Ssg &t=1s>; whole document.

Swedish Search Report for application No. 1930213-2 dated Dec. 19, 2019.

International Search Report for application No. PCT/SE2020/000013 dated Jul. 16, 2020.

* cited by examiner

FILTER PANEL FOR DRUM FILTERS

FIELD OF THE INVENTION

The present invention relates to a filter panel intended for a drum filter device. The filter panels are intended to be arranged on a drum filter around the drum of the drum filter.

TECHNICAL BACKGROUND

Drum filters and panel filters therefore are known. For instance, in WO2016/207143 there is disclosed a filter panel for a drum filter which is used for filtering off solid particles from a liquid. The filter panel according to WO2016/207143 is characterized in that the holes comprise an inclined side wall. As notable from FIG. 1, the holes of the filter panel are quadratic in shape.

One aim of the present invention is to provide an improved filter panel for a drum filter, which filter panel separates particles and an aqueous liquid in a very effective way and which also increases the capacity of the drum filter.

SUMMARY OF THE INVENTION

The stated purpose above is achieved by a filter panel intended for a drum filter, said filter panel having multiple filter holes, wherein each filter hole has a length and a width, and wherein at least a substantial amount of the filter holes has a length which is at least 1.5 times the width, wherein the filter panel has a free surface area which is higher than 81%, preferably at least 83%, more preferably at least 85%, on a side of the filter panel intended to be in contact with a filter cloth of the drum filter. According to one embodiment of the present invention, the free surface area is as high as in the range of 85-90%, e.g. around 87%, according to the present invention.

It should be noted that the filter holes of the filter panel are the holes provided in the actual filter panel support. It should be noted that the holes in the filter panel should not be mixed up with the holes in the filter cloth intended to be brought together with a filter panel on one side thereof.

Furthermore, when a filter panel is arranged in a drum filter the length of the filter holes has the extension of a direction around the entire drum filter, i.e. around the circumference of the drum filter. The width of the filter holes is instead arranged in a cross sectional direction implying that the width has the same direction as the longitudinal extension of the drum filter, i.e. a horizontal direction when a drum filter is arranged on a floor.

The minimum ratio of the length in relation to the width of the filter holes of a factor 1.5 according to the present invention is a key feature. The fact that the holes are "longer" than "wider" provides several advantages when being compared to known filter panels, e.g. the one described in WO2016/207143. First of all, the separation between particles and the aqueous liquid (called water below) is effective and fast. This is as such very important as the particles intended to separate off are separated so that they end up in the separation unit. This also implies that an extensive amount of additional water does not have to be added to ensure to separate of particles which undesirably have ended up in the drum.

Secondly, by the length in relation to width of the filter holes also ensures that the "lift up" of water is minimized when the drum filter rotates. The immediate and calm liberation of water from the filter holes back into the water when the filter panels are lifted by the drum rotation through the water surface is important. The filter panel according to the present invention provides a very effective and quick such liberation. This is also an important aspect to ensure an effective separation of particles from water. Fact is that the type of holes arranged in the filter panel according to the present invention ensures that particles are lifted up with great efficiency, and water is liberated from the filter holes immediate and calm when the filter panels are lifted by the drum rotation up through the water surface on the way to the separation unit. The elongated holes are arranged in the direction of the rotation of the filter panel. These elongated holes and thus fewer horizontal ribs create a calmer water surface, lower paddle impact and thus less water turbulence, which helps the particles to stay inside the filter panels as they are lifted up through the water surface.

It should be noted that the present invention provides the advantage that when the filter panels are lifted up through the water surface, the number of transversal ribs needed is kept at a minimal/right level. These transversal ribs are of course needed to lift up the particles, however if many such are needed this creates an unnecessary paddle effect and turbulence in the water surface which flushes away the particles from the filter panels. According to the present invention, the number of transversal ribs needed is kept low.

To achieve sufficient strength and stability in the filter panel with elongated holes in the longitudinal direction of the filter panel, i.e. in the direction of rotation, and to obtain optimum water purification efficiency, a shorter distance is needed between the longitudinal ribs than between the transversal ribs when these have more or less or exactly the same thin dimensions. However, the thin ribs in the direction of rotation of the drum cut through the water like knives and have no negative effect on the water purification efficiency.

Therefore, the present invention is directed to keeping a low number of transversal ribs and also having thin such ribs to create a high level of free surface area, but where the number of such ribs still provides an optimal separation of the particles from the water and at the same time keeps the water removal at a very low level during the separation. Moreover, the present invention also provides a maintained stability of the filter panels and the filter cloth.

Both aspects above ensure that particles are separated off in a quick and effective way. Moreover, by incorporating the filter panels according to the present invention, the capacity in comparison to a standard filter panel is also increased by 5-10%.

In relation to the filter panels disclosed in WO2016/207143 it may also be mentioned that the type of holes provided in WO2016/207143 with an inclined side wall do not provide both an effective lift up of particles as well as liberation of water during the rotation of one and the same filter panel. Instead, the filter panels are arranged in opposite directions to ensure both effects in one drum filter. The filter holes according to the present invention, however, ensures both an effective lift up and separation of particles as well as a quick liberation of water on one and the same filter panel when that filter panel travels through the water surface and up into the air and around the filter drum. Furthermore, the filter panel according to the present invention also provides a comparatively large free surface area, which increases the capacity. This is further described below together with other advantages of the present invention.

In CN207667261 U discloses a filter panel with multiple filter holes and wherein the length of the width ratio of the rectangular through holes is said to be 1:2.

The filter panel according to the present invention differs in several ways from the filter panel disclosed in CN207667261 U. First of all, the free surface area of more than 81% according to the present invention is not shown or hinted in CN207667261 U. Secondly, the filter panel according to the present invention also has other important features, such as the thickness of the ribs, and filter hole properties, such as specific and preferred hole lengths and hole widths, which are not shown or hinted in CN207667261 U.

SPECIFIC EMBODIMENTS OF THE INVENTION

Figure 1:
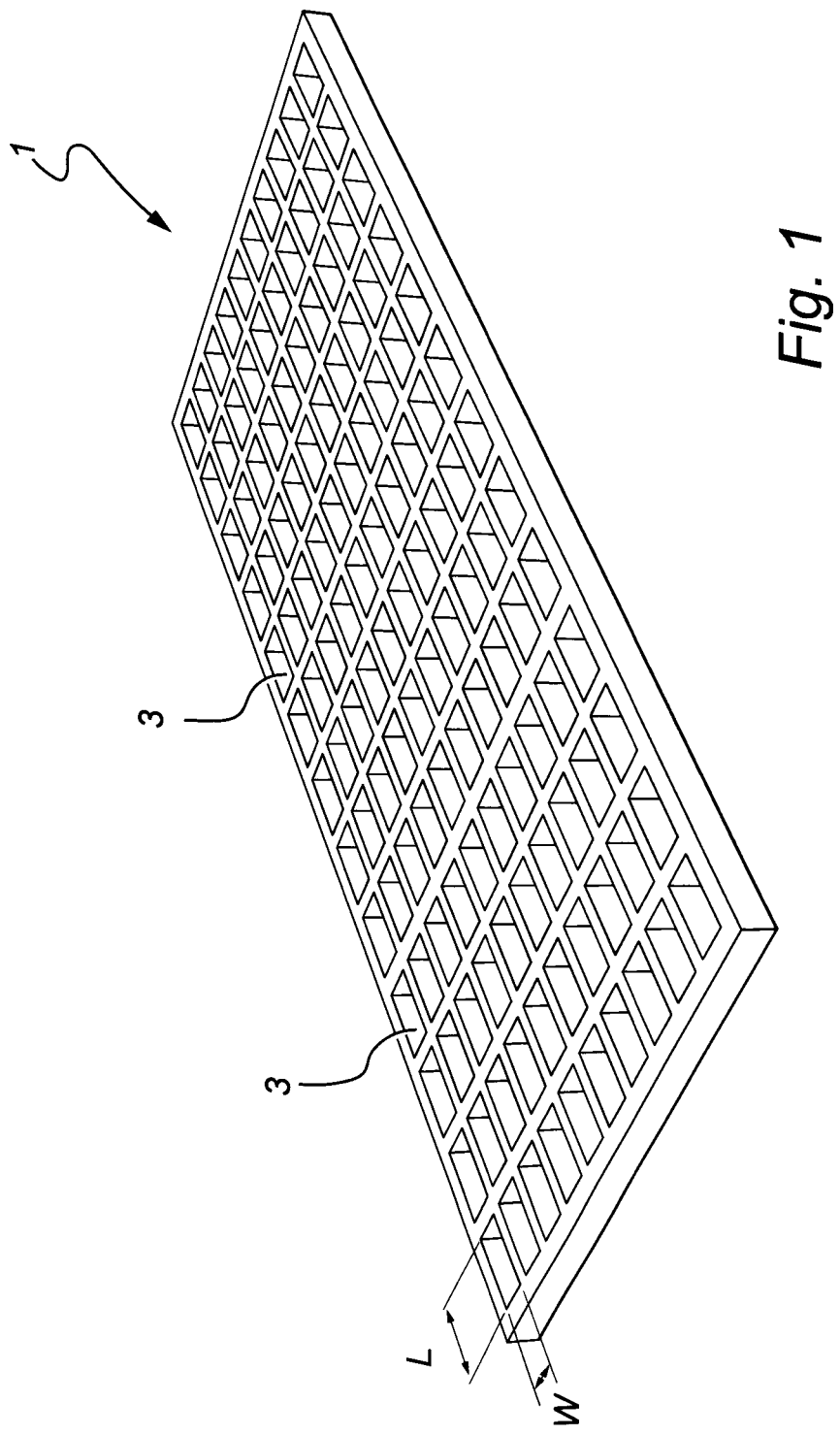
In FIG. 1 there is shown a filter panel according to one specific embodiment of the present invention.

Below some specific embodiment are disclosed and discussed further.

According to one embodiment of the present invention, the filter panel comprises ribs surrounding the multiple filter holes, and wherein the ribs have a thickness of maximum 2.0 mm, preferably in the range of 1.0-2.0 mm, more preferably maximum 1.6 mm, e.g. in the range of 1.0-1.6 mm, on a side of the filter panel intended to be in contact with a filter cloth of the drum filter. It should be noted that such a thickness of the ribs together with the shape and sizes of the filter holes provide for the high free surface area according to the present invention. This feature of having a high free surface area is a key according to the present invention. As mentioned above, the filter panel according to the present invention provides an effective separation of particles from water, with an improved yield and also an increased capacity. As an example, to be able to reach at least 85% free surface area, the thickness of the ribs on the side of the filter panel where the filter cloth is applied should be below 2.0 mm, such as preferably below 1.8 mm, more preferably below 1.6 mm, e.g. around 1.5 mm.

In the context of free surface area as mentioned above it should be noted that several different aspects and embodiments mentioned below have an effect on this parameter. Important examples are shapes and sizes of the holes, e.g. width in relation to length, as mentioned below.

According to yet another embodiment of the present invention, the filter panel comprises ribs with an increasing thickness from the side of the filter panel intended to be in contact with a filter cloth of the drum filter to the other side of the filter panel, wherein the ribs have a thickness of maximum 2.0 mm, preferably in the range of 1.0-2.0 mm, more preferably maximum 1.6 mm, on a side of the filter panel intended to be in contact with a filter cloth of the drum filter and wherein a thickness of the ribs on the other side of the filter panel is in the range of 2.0-4.0 mm. The change in the rib thickness, from one side to the other, is of interest when producing the filter panels according to the present invention. This change in rib thickness is of interest to enable an improved release of the filter panels from the production cast moulds used.

Below there is disclosed several other embodiments of the present invention. Again, several, in fact almost all of them, have a correlation to the parameter of free surface area, which is of great importance according to the present invention.

According to one specific embodiment of the present invention, wherein at least 50%, preferably at least 75%, more preferably at least 90%, of the filter holes have a length which is at least 1.5 times the width, preferably wherein substantially all of the filter holes have a length which is at least 1.5 times the width. Some filter holes, such as e.g. the one close to the frame, or only in the corners of the filter panel, may have a different size to simplify for production reasons when producing the filter panel or to simplify when assembling a filter panel to a frame and then assembling this on a drum filter. The direction of the present invention, however, is to have as many filter holes as possible to comply with the restriction of having a length which is at least 1.5 times the width.

It should be said that in relation to the percentages given above and below these relate to a share of the number of filter holes.

Moreover, it is not only the relationship of length to width of the filter holes that are of relevance to provide an improved effect according to the present invention. Also the shape is preferably rectangular. Therefore, according to one embodiment of the present invention, at least 50%, preferably at least 75%, more preferably at least 90%, of the filter holes have a substantially rectangular shape, preferably substantially all of the filter holes are totally rectangular holes.

Moreover, in a preferred embodiment of the present invention, the ratio of the length to the width is higher than 1.5. In line with this, according to one preferred embodiment of the present invention, at least 50%, preferably at least 75%, more preferably at least 90%, of the filter holes have a length which is at least 2 times the width, preferably wherein substantially all of the filter holes have a length which is at least 2 times the width. Moreover, according to yet another embodiment, at least 50%, preferably at least 75%, more preferably at least 90%, of the filter holes have a length which is at least 2.5 times the width, preferably wherein substantially all of the filter holes have a length which is at least 2.5 times the width.

Moreover, to optimize even further, then the absolute values of the length and width may also be key parameters. According to one embodiment of the present invention, at least 50%, preferably at least 75%, more preferably at least 90%, most preferably substantially all of the filter holes have a length of at least 40 mm, preferably at least 45 mm. Furthermore, according to yet another embodiment of the present invention, at least 50%, preferably at least 75%, more preferably at least 90%, most preferably substantially all of the filter holes have a length in the range of 45-80 mm, preferably in the range of 50-70 mm.

Furthermore, according to yet another embodiment, at least 50%, preferably at least 75%, more preferably at least 90%, most preferably substantially all of the filter holes have a width of at least 10 mm. According to yet another preferred embodiment, at least 50%, preferably at least 75%, more preferably at least 90%, most preferably substantially all of the filter holes have a width in the range of 10-35 mm, preferably in the range of 15-35 mm.

Based on the above, one very valid embodiment according to the present invention implies filter holes with a length in the range of 50-70 mm and a width in the range of 15-35 mm, and wherein the length is at least 2 times the width.

Furthermore, the present invention also refers to a drum filter comprising several filter panels according to the present invention a filter cloth.

Moreover, according to one preferred embodiment of the present invention there is disclosed a drum filter according to the present invention, wherein the filter panels are arranged so that the length and thus elongation of the filter holes are arranged in the direction of the rotation of the filter panels and drum filter.

DETAILED DESCRIPTION OF THE DRAWINGS AND FURTHER EXPLANATION OF THE PRESENT INVENTION

In FIG. 1 there is shown a filter panel 1 according to one specific embodiment of the present invention. The filter panel 1 comprises several filter holes 3 with a length L and a width W. As seen, the filter holes 3 are rectangular and has a length L which is at least 1.5 times the width W.

It should be noted that one side of the filter panels, the ribs or bars may be thinner. This is a standard when producing multiple filter panels in moulding/casting tools or the like to enable to remove them from the tools. The side with the thinner ribs or bars is the one intended to be arranged closest to the filter cloth of the drum filter device. Furthermore, in this regard it should be noted that having somewhat thinner ribs or bars on one side of a filter panel is state of the art and has been standard for a long time, and should not be mixed up with having inclined walls such as defined for the filter panels according to WO2016/207143.

Furthermore, in relation to FIG. 1 it should also be noted that there may be smaller filter holes provided along or close to the framer, i.e. where there is provided more rib material. This may be of interest to create stability for a filter panel according to the present invention.

Figure 2:
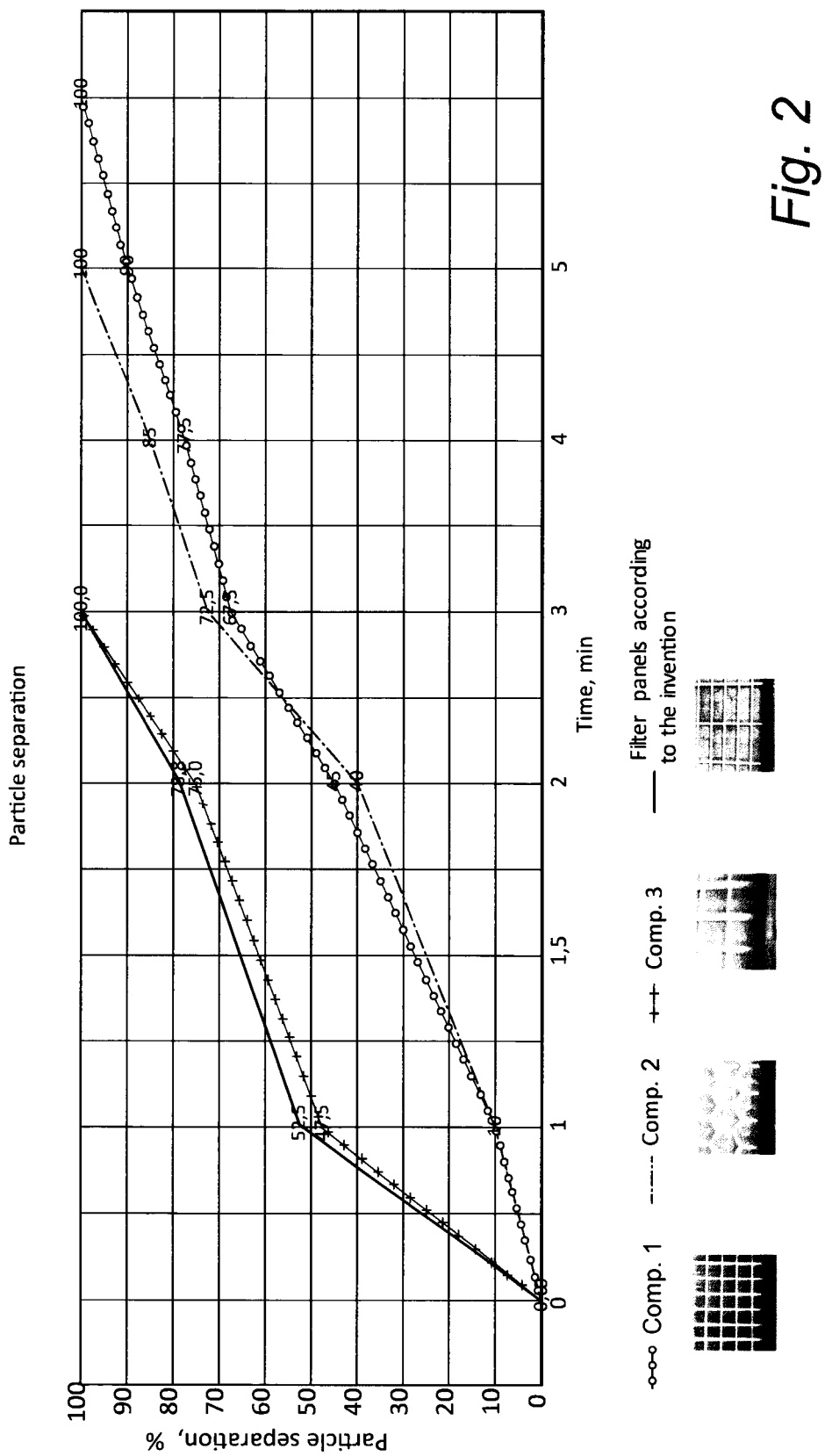
In FIG. 2 there is shown comparative trials when comparing a filter panel according to the present invention with other filter panels.

In FIG. 2 there is shown comparative trials when comparing a filter panel 1 according to the present invention with other filter panels. In the graph, the particle separation in % is shown over time for four different filter panel types. It should be noted that this parameter is one important, however there are others, such as the ones mentioned above, e.g. capacity increase etc. The first version (comp 1) is a filter panel having small quadratic filter holes. The second alternative (comp 2) is a filter panel having hexagonal holes. As seen, these two alternatives exhibit a lower degree of particle separation/time when being compared to the filter panel according to the present invention. The third one (comp 3) is an alternative in line with the filter panels according to WO2016/207143 where the filter holes have an inclined side wall. The particle separation according to these trials show that this third one almost exhibit as good results as the for the filter panels according to the present invention. The filter panels according to the present invention, however, show the best particle separation results. It should be noted that this positive effect is obtained by the rectangular shape of the filter holes. The filter holes according to the present invention do not have inclined side wall.

Moreover, in this context it should also be noted that the filter panels according to the present invention have other advantages when being compared to the filter panels according to WO2016/207143. One of these advantages is mentioned above, such as the fact that each filter hole provides both an effective lift up of particles as well as liberation of water during the rotation of one and the same filter panel. Another advantage relating thereto is a provision of an increased capacity per filter area of the filter panels.

Furthermore, as clearly stated above, the filter panel according to the present invention suitably has filter holes being rectangular and where substantially all of the filter holes have a length of at least 40 mm, e.g. in the range of 40-80 mm, preferably in the range of 50-70 mm. This shape implies that comparatively less rib material is used in a filter panel according to the present invention when being compared to known filter panels. This is beneficial for several reasons. First of all, less material is used, which in itself is a material and cost advantage. Secondly, less rib material implies an increased free surface area (free hole area) of the filter panel, which in turn provides more capacity. When calculating the increased free filter area and thus increased filter capacity it should be expected that this is in the magnitude of almost 10% when being compared to known filter panels. Thirdly, the rectangular or longitudinal shape in themselves have advantages, such as mentioned above. One first advantages is that water is not tumbled around which would be the case if quadratic filter holes with less distance between the lifting ribs are used. A disturbance of the water is thus avoided or diminished. This improvement also ensures that there is a decreased amount of water being lifted out from the filter to the waste flow in the separation operation, and therefore a comparatively smaller amount of water is needed to be added in view of these losses. Moreover, the improved handling of water not being lifted up by the filter panel ribs also provides for an effective lift up of particles. Therefore, particles follow the filter panel up in a more effective way, and thus an improved effective separation is obtained. Moreover, air easier flows into the filter holes as there is an increased free filter surface above the water surface, which lets air in and which inhibits under pressure, said under pressure rendering a risk to keep water staying in the filter panel. This is also beneficial.

In relation to the benefits mentioned above, some are true when being compared to some existing filter panels, other advantages are true when comparing to others. When comparing to some existing filter panels all disclosed benefits are true.

Figure 3:
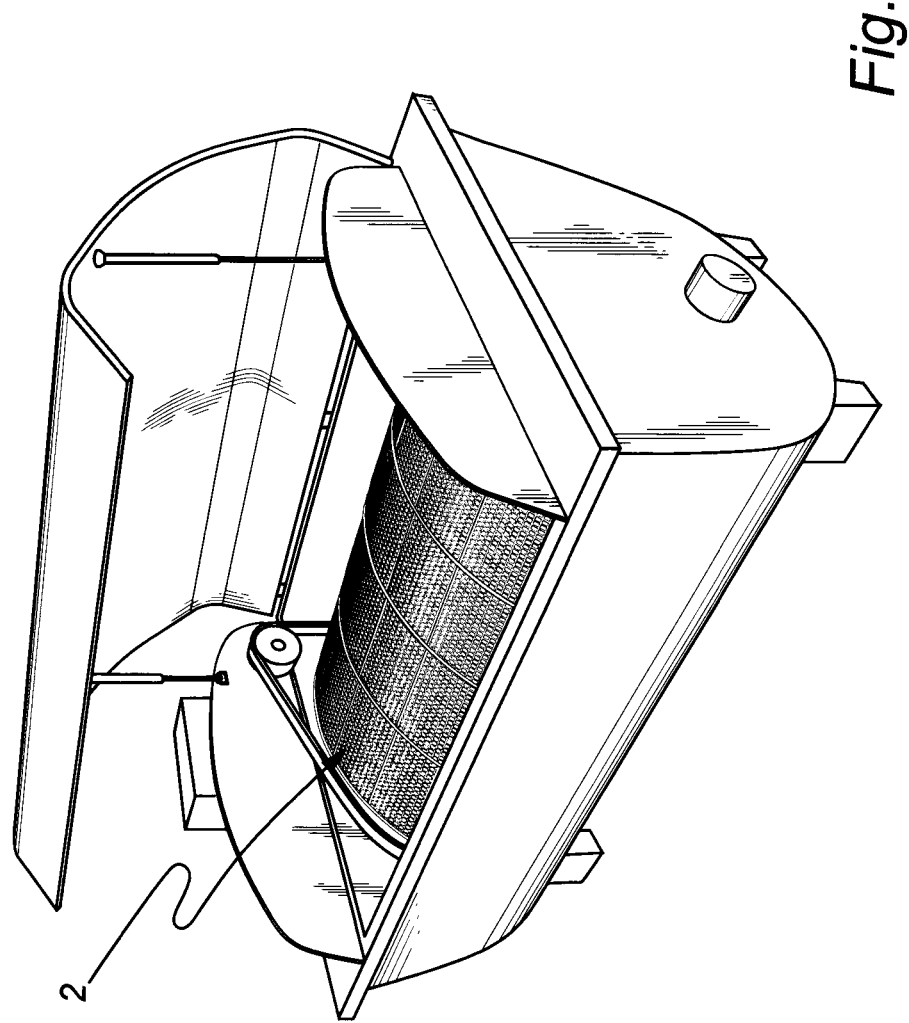
In FIG. 3 there is shown a possible drum filter device comprising several filter panels according to one embodiment of the present invention.

In FIG. 3 there is shown one possible drum filter device 2 comprising several filter panels 1 according to one embodiment of the present invention. In this regard it should be mentioned that the filter panels 1 are arranged around the drum filter device 2 so that the rectangular filter holes are configured around the drum in their longitudinal direction.

The invention claimed is:

1. A filter panel intended for a drum filter, said filter panel having multiple filter holes, wherein each filter hole has a length and a width W, characterized by that at least a substantial amount of the filter holes has a length L which is at least 1.5 times the width W, wherein the filter panel has a free surface area which is at least 85%, on a first side of the filter panel intended to be in contact with a filter cloth of the drum filter, wherein the filter panel comprises ribs with an increasing thickness from the first side of the filter panel intended to be in contact with the filter cloth of the drum filter to a second side of the filter panel, wherein the ribs have a thickness of maximum 2.0 mm on the first side of the filter panel intended to be in contact with the filter cloth of the drum filter, wherein at least 90% of the filter holes have a substantially rectangular shape, wherein substantially all of the filter holes have a length L in the range of 40-80 mm, and wherein the filter panel is arranged so that the length L and thus elongation of the filter holes are arranged in a direction of rotation of the filter panels.

2. The filter panel according to claim 1, wherein the ribs have a thickness in the range of 1.0-2.0 mm on the first side of the filter panel intended to be in contact with the filter cloth of the drum filter.

3. The filter panel according to claim 2, wherein the ribs have a thickness in the range of 1.0-2.0 mm on the first side of the filter panel intended to be in contact with the filter cloth of the drum filter and wherein a thickness of the ribs on the second side of the filter panel is in the range of 2.0-4.0 mm.

4. The filter panel according to claim 1, wherein at least 75% of the filter holes have a length L which is at least 1.5 times the width W.

5. The filter panel according to claim 1, wherein at least 75% of the filter holes have a length L which is at least 2 times the width W.

6. The filter panel according to claim 1, wherein at least 75% of the filter holes have a length L which is at least 2.5 times the width W.

7. The filter panel according to claim 1, wherein at least 75% of the filter holes have a length L of at least 40 mm.

8. The filter panel according to claim 1, wherein at least 75% of the filter holes have a length L in the range of 45-80 mm.

9. The filter panel according to claim 1, wherein at least 75% of the filter holes have a width W of at least 10 mm.

10. The filter panel according to claim 1, wherein at least 75% of the filter holes have a width W in the range of 10-35 mm.

11. The drum filter comprising several filter panels according to claim 1 and the filter cloth.

12. The drum filter according to claim 11, wherein the filter panels are arranged so that the length L and thus elongation of the filter holes are arranged in the direction of rotation of the filter panels.

13. The filter panel according to claim 1, wherein at least 90% of the filter holes have a length L which is at least 1.5 times the width W.

14. The filter panel according to claim 1, wherein at least 90% of the filter holes have a length L which is at least 2 times the width W.

15. The filter panel according to claim 1, wherein at least 90% of the filter holes have a length L which is at least 2.5 times the width W.

16. The filter panel according to claim 1, wherein at least 90% of the filter holes have a length L of at least 40 mm.

17. The filter panel according to claim 1, wherein at least 90% of the filter holes have a length L in the range of 45-80 mm.

18. The filter panel according to claim 1, wherein at least 90% of the filter holes have a width W of at least 10 mm.

19. The filter panel according to claim 1, wherein at least 90% of the filter holes have a width W in the range of 10-35 mm.

* * * * *